(12) United States Patent
Shah et al.

(10) Patent No.: US 7,339,494 B2
(45) Date of Patent: Mar. 4, 2008

(54) ACOUSTIC TELEMETRY TRANSCEIVER

(75) Inventors: Vimal V. Shah, Sugarland, TX (US);
Eugene J. Linyaev, Houston, TX (US);
Donald G. Kyle, Plano, TX (US);
Wallace R. Gardner, Houston, TX
(US); Jeffrey L. Moore, Houston, TX
(US)

(73) Assignee: Halliburton Energy Services, Inc.,
Houston, TX (US)

( * ) Notice: Subject to any disclaimer, the term of this patent is extended or adjusted under 35 U.S.C. 154(b) by 254 days.

(21) Appl. No.: 10/898,884

(22) Filed: Jul. 26, 2004

(65) Prior Publication Data

US 2006/0002232 A1    Jan. 5, 2006

Related U.S. Application Data

(60) Provisional application No. 60/584,629, filed on Jul. 1, 2004, provisional application No. 60/588,524, filed on Jul. 16, 2004.

(51) Int. Cl.
*G01V 3/00* (2006.01)
(52) U.S. Cl. ................ 340/855.7; 340/854.3; 367/81; 367/82
(58) Field of Classification Search .......... 367/81, 367/82; 340/854.3, 855.7
See application file for complete search history.

(56) References Cited

U.S. PATENT DOCUMENTS

| 4,027,282 A | 5/1977 | Jeter ........................ 340/18 |
| 4,282,588 A | 8/1981 | Chanson et al. | |
| 4,302,826 A * | 11/1981 | Kent et al. ................ 367/82 |
| 4,314,365 A | 2/1982 | Petersen et al. ........... 367/82 |
| 4,992,997 A | 2/1991 | Bseisu ...................... 367/82 |
| 5,354,956 A | 10/1994 | Orban et al. | |
| 5,387,767 A | 2/1995 | Aron et al. | |
| 5,644,186 A | 7/1997 | Birchak et al. ........... 310/337 |
| 5,675,325 A | 10/1997 | Taniguchi et al. ....... 340/854.4 |
| 5,703,836 A | 12/1997 | Drumheller ............... 367/165 |
| 5,798,488 A | 8/1998 | Beresford et al. | |
| 6,137,747 A * | 10/2000 | Shah et al. ................ 367/81 |
| 6,147,932 A | 11/2000 | Drumheller ............... 367/165 |
| 6,272,916 B1 * | 8/2001 | Taniguchi et al. ....... 73/152.47 |
| 6,442,105 B1 | 8/2002 | Tubel et al. | |
| 6,466,513 B1 | 10/2002 | Pabon et al. ............... 367/35 |

FOREIGN PATENT DOCUMENTS

| EP | 0552833 A1 | 7/1993 |
| EP | 0747732 A2 | 12/1996 |
| EP | 0994237 A2 | 4/2000 |
| EP | 1193368 A2 | 4/2002 |
| WO | WO-2006007572 A2 | 1/2006 |
| WO | WO-2006007572 A3 | 1/2006 |

OTHER PUBLICATIONS

Sinanovic, S., et al., "Data Communication Along the Drill String Using Acoustic Waves", *Acoustics, Speech, and Signal Processing, International Conference on Montreal. 4*. XP010718707, (May 17, 2004), 909-912.

* cited by examiner

*Primary Examiner*—Timothy Edwards, Jr.
(74) *Attorney, Agent, or Firm*—Schwegman, Lundberg & Woessner P.A.

(57) ABSTRACT

One embodiment includes an apparatus that includes a piezoelectric transducer to generate an acoustic signal that is to modulate along a mandrel, wherein the piezoelectric transducer includes at least one piezoelectric element and at least one electrode that is without non-permanent joints.

27 Claims, 9 Drawing Sheets

ACOUSTIC TELEMETRY TRANSCEIVER

This application claims priority to U.S. Provisional Application No. 60/584,629, filed Jul. 1, 2004 and U.S. Provisional Application No. 60/588,524 filed Jul. 16, 2004, both of which are incorporated herein by reference.

TECHNICAL FIELD

The application relates generally to communications. In particular, the application relates to acoustic communications between a downhole drilling assembly and a surface of a well.

BACKGROUND

During drilling operations for extraction of hydrocarbons, a variety of communication and transmission techniques have been attempted to provide real time data from the vicinity of the bit to the surface during drilling. The use of measurements while drilling (MWD) with real time data transmission provides substantial benefits during a drilling operation. For example, monitoring of downhole conditions allows for an immediate response to potential well control problems and improves mud programs.

Measurement of parameters such as weight on bit, torque, wear and bearing condition in real time provides for more efficient drilling operations. In fact, faster penetration rates, better trip planning, reduced equipment failures, fewer delays for directional surveys, and the elimination of a need to interrupt drilling for abnormal pressure detection is achievable using MWD techniques.

Currently, there are four major categories of telemetry systems that have been used in an attempt to provide real time data from the vicinity of the drill bit to the surface; namely, acoustic waves, mud pressure pulses, insulated conductors and electromagnetic waves.

With regard to acoustic waves, typically, an acoustic signal is generated near the bit and is transmitted through the drill pipe, mud column or the earth. It has been found, however, that the very low intensity of the signal which can be generated downhole, along with the acoustic noise generated by the drilling system, makes signal detection difficult. Reflective and refractive interference resulting from changing diameters and thread makeup at the tool joints compounds the signal attenuation problem for drill pipe transmission. Such reflective and refractive interference causes interbit interference among the bits of data being transmitted. Additionally, ambient thermal and loading elongation may cause loss of contact between the transmitter components in an acoustic transmitter. Compression load on such a transmitter may lock the piezoelectric stack, and, therefore, may not allow transfer of momentum to the tubing. Furthermore, harsh vibration and shock loads tend to induce stress fractures in the brittle piezoelectric and magnetostrictive materials, which could disintegrate the acoustic transmitter assembly.

In a mud pressure pulse system, the resistance of mud flow through a drill string is modulated by means of a valve and control mechanism mounted in a special drill collar near the bit. This type of system typically transmits at one bit per second as the pressure pulse travels up the mud column at or near the velocity of sound in the mud. It is well known that mud pulse systems are intrinsically limited to a few bits per second due to attenuation and spreading of pulses.

Insulated conductors or hard wire connection from the drill bit to the surface is an alternative method for establishing downhole communications. This type of system is capable of a high data rate and two-way communication is possible. It has been found, however, that this type of system requires a special drill pipe and special tool joint connectors that substantially increase the cost of a drilling operation. Also, these systems are prone to failure as a result of the abrasive conditions of the mud system and the wear caused by the rotation of the drill string.

The fourth technique used to telemeter downhole data to the surface uses the transmission of electromagnetic waves through the earth. A current carrying downhole data signal is input to a toroid or collar positioned adjacent to the drill bit or input directly to the drill string. When a toroid is utilized, a primary winding, carrying the data for transmission, is wrapped around the toroid and a secondary is formed by the drill pipe. A receiver is connected to the ground at the surface where the electromagnetic data is picked up and recorded. It has been found, however, that in deep or noisy well applications, conventional electromagnetic systems are unable to generate a signal with sufficient intensity to be recovered at the surface.

In general, the quality of an electromagnetic signal reaching the surface is measured in terms of signal to noise ratio. As the ratio drops, it becomes more difficult to recover or reconstruct the signal. While increasing the power of the transmitted signal is an obvious way of increasing the signal to noise ratio, this approach is limited by batteries suitable for the purpose and the desire to extend the time between battery replacements. These approaches have allowed development of commercial borehole electromagnetic telemetry systems that work at data rates of up to four bits per second and at depths of up to 4000 feet without repeaters in MWD applications. It would be desirable to transmit signals from deeper wells and with much higher data rates which will be required for logging while drilling, LWD, systems.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1. However, reference numbers are the same for those elements that are the same across different Figures. In the drawings.

DETAILED DESCRIPTION

Methods, apparatus and systems for an acoustic telemetry transceiver are described. In the following description, numerous specific details are set forth. However, it is understood that embodiments of the invention may be practiced without these specific details. In other instances, well-known circuits, structures and techniques have not been shown in detail in order not to obscure the understanding of this description.

While described with reference to transmitting downhole data to the surface during measurements while drilling (MWD), embodiments of the invention are not so limited. For example, some embodiments are applicable to transmission of data from the surface to equipment that is downhole. Additionally, some embodiments of the invention are applicable not only during drilling, but throughout the life of a wellbore including, but not limited to, during logging, drill stem testing, completing and production. Further, some embodiments of the invention can be in other noisy conditions, such as hydraulic fracturing and cementing.

As further described below, embodiments provide a system for transmitting an acoustic signal that is essentially linear. Embodiments allow for such linearity by having an acoustic telemetry transceiver that approximately removes lateral movement (relative to the axis of the drill string), while allowing for approximately non-restricted movement along the axis of the drill string. Additionally, embodiments of the acoustic telemetry transceiver may be configured to be stable over a wide range of operating temperatures and to withstand large shock and vibrations. Some embodiments include an acoustic telemetry transceiver having a backing mass that is housed in a linear/journal bearing. In some embodiments, an acoustic telemetry transceiver (including the piezoelectric stack) is independent of non-permanent joints (such as solder joints). In some embodiments, the piezoelectric stack is coupled to a tapered conical section of a mandrel of the drill string through a different tapered conical section. As further described below, the positions of the tapered conical sections are such that contact is increased there between based on a pressure of a flow of a fluid between the piezoelectric stack and the mandrel. Furthermore, some embodiments provide modular components such that one of component in the system may be interchanged without having to interchange other components therein.

Figure 1:
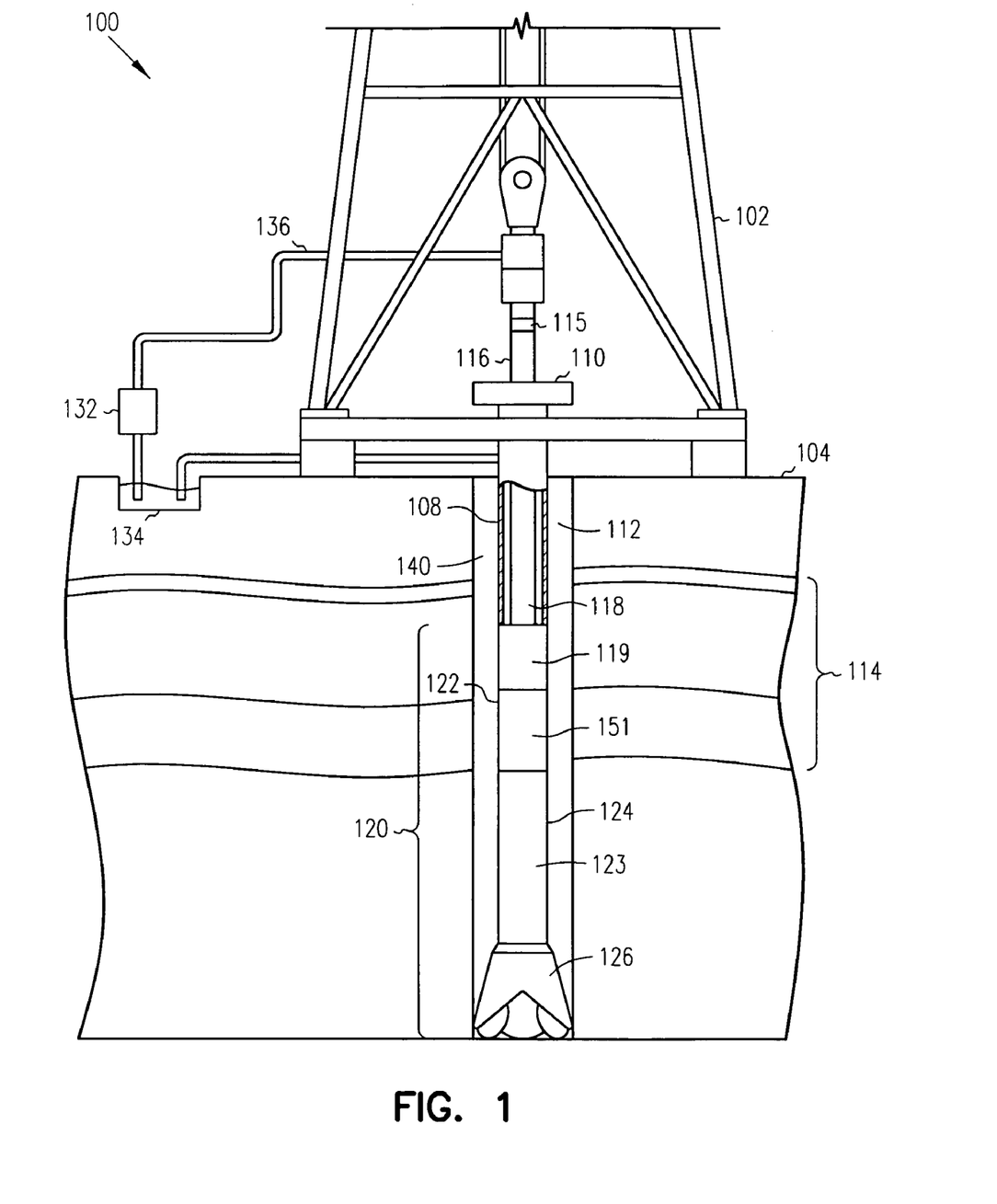
FIG. 1 illustrates a system for drilling operations, according to some embodiments of the invention.

FIG. 1 illustrates a system for drilling operations, according to some embodiments of the invention. A system 100 includes a drilling rig 102 located at a surface 104 of a well. The drilling rig 102 provides support for a drill string 108. The drill string 108 penetrates a rotary table 110 for drilling a borehole 112 through subsurface formations 114. The drill string 108 includes a Kelly 116 (in the upper portion), a drill pipe 118 and a bottom hole assembly 120 (located at the lower portion of the drill pipe 118). The bottom hole assembly 120 may include a drill collar 122, a downhole tool 124 and a drill bit 126. The downhole tool 124 may be any of a number of different types of tools including Measurement While Drilling (MWD) tools, Logging While Drilling (LWD) tools, etc.

During drilling operations, the drill string 108 (including the Kelly 116, the drill pipe 118 and the bottom hole assembly 120) may be rotated by the rotary table 110. In addition or alternative to such rotation, the bottom hole assembly 120 may also be rotated by a motor (not shown) that is downhole. The drill collar 122 may be used to add weight to the drill bit 126. The drill collar 122 also may stiffen the bottom hole assembly 120 to allow the bottom hole assembly 120 to transfer the weight to the drill bit 126. Accordingly, this weight provided by the drill collar 122 also assists the drill bit 126 in the penetration of the surface 104 and the subsurface formations 114.

During drilling operations, a mud pump 132 may pump drilling fluid (known as "drilling mud") from a mud pit 134 through a hose 136 into the drill pipe 118 down to the drill bit 126. The drilling fluid can flow out from the drill bit 126 and return back to the surface through an annular area 140 between the drill pipe 118 and the sides of the borehole 112. The drilling fluid may then be returned to the mud pit 134, where such fluid is filtered. Accordingly, the drilling fluid can cool the drill bit 126 as well as provide for lubrication of the drill bit 126 during the drilling operation. Additionally, the drilling fluid removes the cuttings of the subsurface formations 114 created by the drill bit 126.

The drill string 108 may include one to a number of different sensors 151, which monitor different downhole parameters. Such parameters may include the downhole temperature and pressure, the various characteristics of the subsurface formations (such as resistivity, density, porosity, etc.), the characteristics of the borehole (e.g., size, shape, etc.), etc. The drill string 108 may also include an acoustic telemetry transceiver 123 that transmits telemetry signals in the form of acoustic vibrations in the tubing wall of the drill sting 108. An acoustic telemetry receiver 115 is coupled to the kelly 116 to receive transmitted telemetry signals. One or more repeaters 119 may be provided along the drill string 108 to receive and retransmit the telemetry signals. The repeaters 119 may include both an acoustic telemetry receiver and an acoustic telemetry transmitter configured similarly to the acoustic telemetry receiver 115 and the acoustic telemetry transceiver 123.

Figure 2:
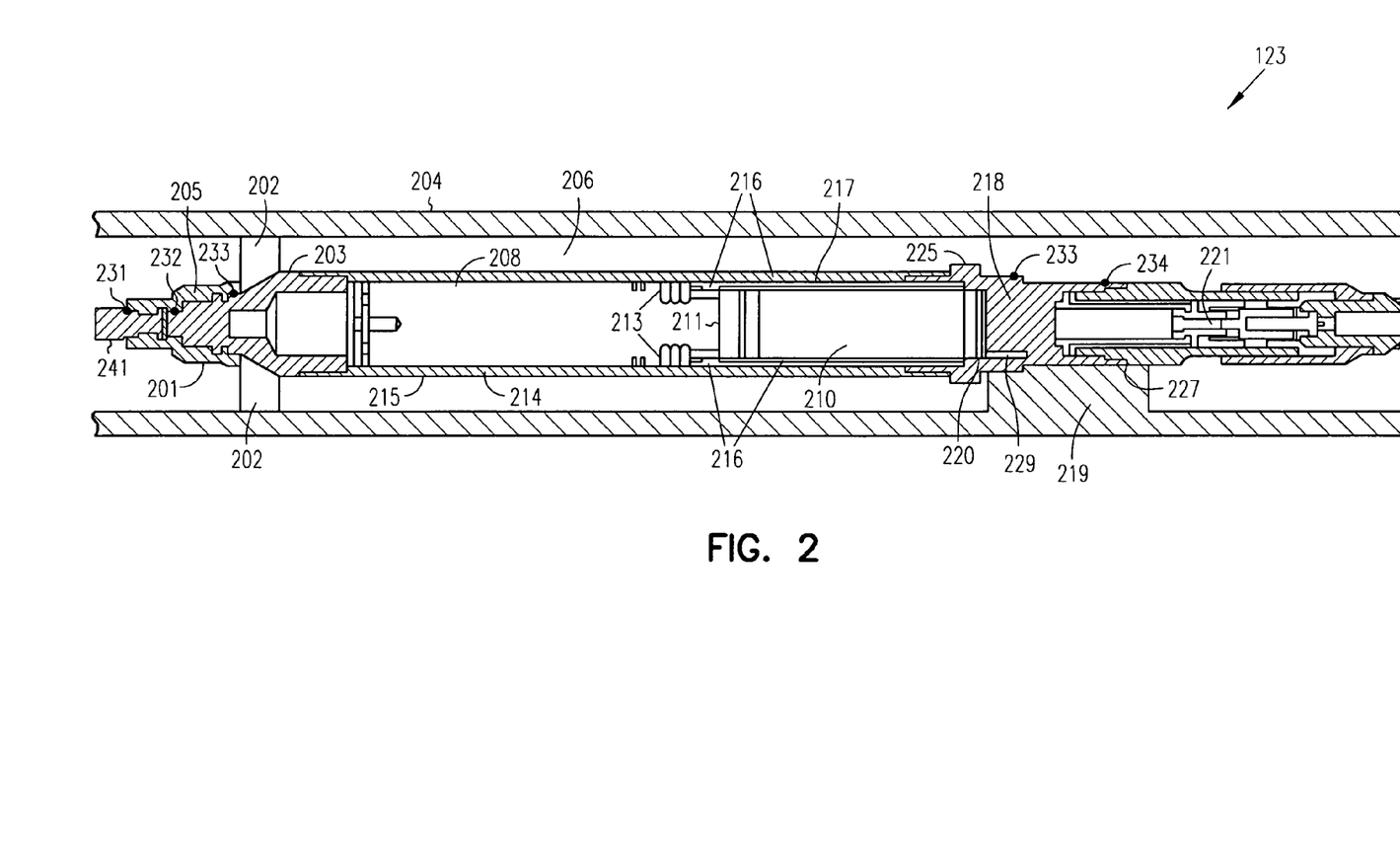
FIG. 2 illustrates an acoustic telemetry transceiver, according to some embodiments of the invention.

FIG. 2 illustrates an acoustic telemetry transceiver, according to some embodiments of the invention. In particular, FIG. 2 illustrates an embodiment of the acoustic telemetry transceiver 123. As shown, the acoustic telemetry transceiver 123 is within a mandrel 204 that is part of the drill string 108. The acoustic telemetry transceiver 123 may include a centralizer assembly 201, a top sub 203, an acoustic actuator 206, a linear (or journal) bearing 214, a housing 215, a sleeve 216 (having threads 213), a tapered conical section 218 and wiring 221. The acoustical actuator 206 may include a backing mass 208, a piezoelectric transducer 210 (which includes a disk 211), and a strain gage 217. The centralizer assembly 201 may include a centralizer 202, a centralizer sub 205 and a bolt 241. The bolt 241 may include an O-ring groove 231. The top sub may include an O-ring groove 232 and an O-ring groove 233. In some embodiments, the acoustic actuator 206 may be housed in a pressure sealed chamber. The acoustic telemetry transceiver 123 may be positioned in the downhole tool 124 such that the backing mass 208 is on top of the piezoelectric transducer 210 relative to the surface. While the acoustical actuator 206 is described as having a piezoelectric transducer, in some embodiments, any type of vibratory actuator may be used in place of the piezoelectric transducer. The tapered conical section 218 may include inner threads 220, first outer threads 225, second outer threads 227 and a bulkhead connector 229.

The piezoelectric transducer 210 is housed in the sleeve 216. In the context of this assembly, the sleeve 216 may be a member of suitable geometry and may be comprised of materials such that the sleeve 216 expands and contracts proportional to the forces levied at the ends of the sleeve 216. Thus, in an embodiment, a metallic rod may be used as the sleeve 216.

The backing mass 208 may be threaded into the threads 213 of the sleeve 216 until the backing mass 208 is abutted against the piezoelectric transducer 210. In some embodiments, the piezoelectric transducer 210 includes the disk 211. The disk 211 may be free floating until the backing mass 208 is abutted against the disk 211. The disk 211 may act as a buffer to preclude the application of torque to the elements in the piezoelectric transducer 210 while the backing mass 208 is threaded into the sleeve 216 and abutted against the piezoelectric transducer 210. In other words, the disk 211 may act to separate the backing mass 208 from the piezoelectric elements in the piezoelectric transducer 210 in terms of the torque applied to the backing mass 208.

The strain gage 217 may be positioned on a side of the sleeve 216 to monitor the load on the piezoelectric transducer 210. The strain gage 217 may be temperature compensated. In some embodiments, the sleeve 216 may be linear in displacement versus the load. The sleeve 216 may be stretched by a torquing mechanism until a desired strain is achieved as reflected by the strain gage 217. Accordingly, the level of torque applied because of the threading of the backing mass 208 into the threads 213 may be monitored by the strain gage 217. Once the given torque has been applied, one or more screws (not shown) may be threaded into the sleeve 216 to lock the thread into place, thereby precluding the lost of this torque during subsequent operations.

The sleeve 216 allows for compression of the piezoelectric elements in the piezoelectric transducer 210. As the sleeve 216 is stretched, the piezoelectric elements may become compressed. In some embodiments, the material of the sleeve 216 may be suitably selected to have a low coefficient of thermal expansion (e.g., invar) to preclude the tension release because of changes in temperature. The sleeve 216 may be composed of one of a number of different materials, including invar, steel, stainless steel, etc. The sleeve 216 may be a hollow sleeve of appropriate stiffness to allow vibratory resonances in the frequency band of interest. The stiffness of the sleeve 216 may be modified to suit the vibratory characteristics of the assembly by varying the thickness of the sleeve 216.

The backing mass 208 may be composed of one of a number of different materials, including tungsten, steel, aluminum, stainless steel, depleted uranium, lead, etc. A value of the mass of the backing mass 208 is such that the acoustic actuator 206 may resonant in a given frequency range.

Figure 7A:
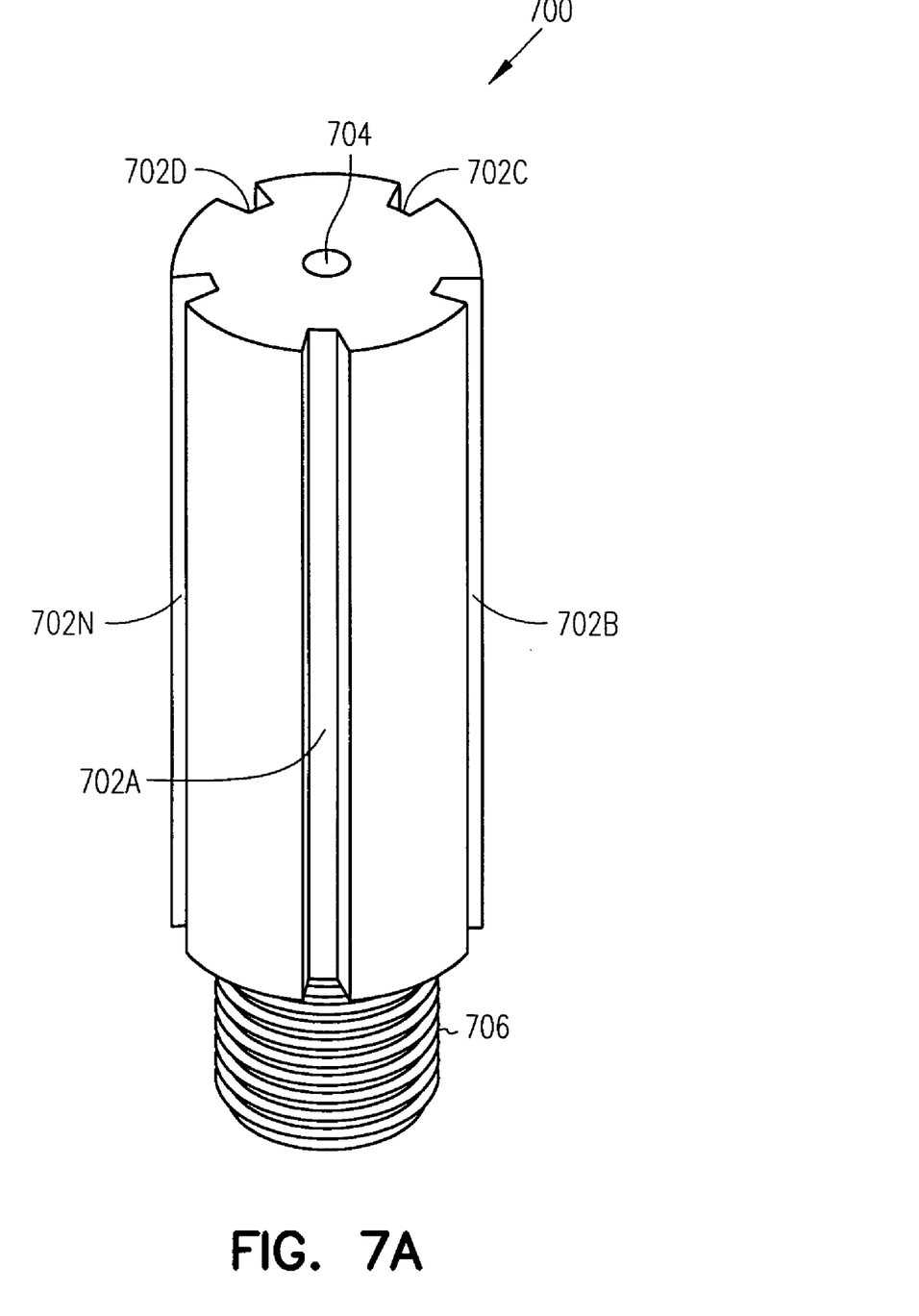
FIGS. 7A–7B illustrate a configuration for a backing mass and its supporting components for an acoustic telemetry transceiver, according to some embodiments of the invention.
Figure 7B:
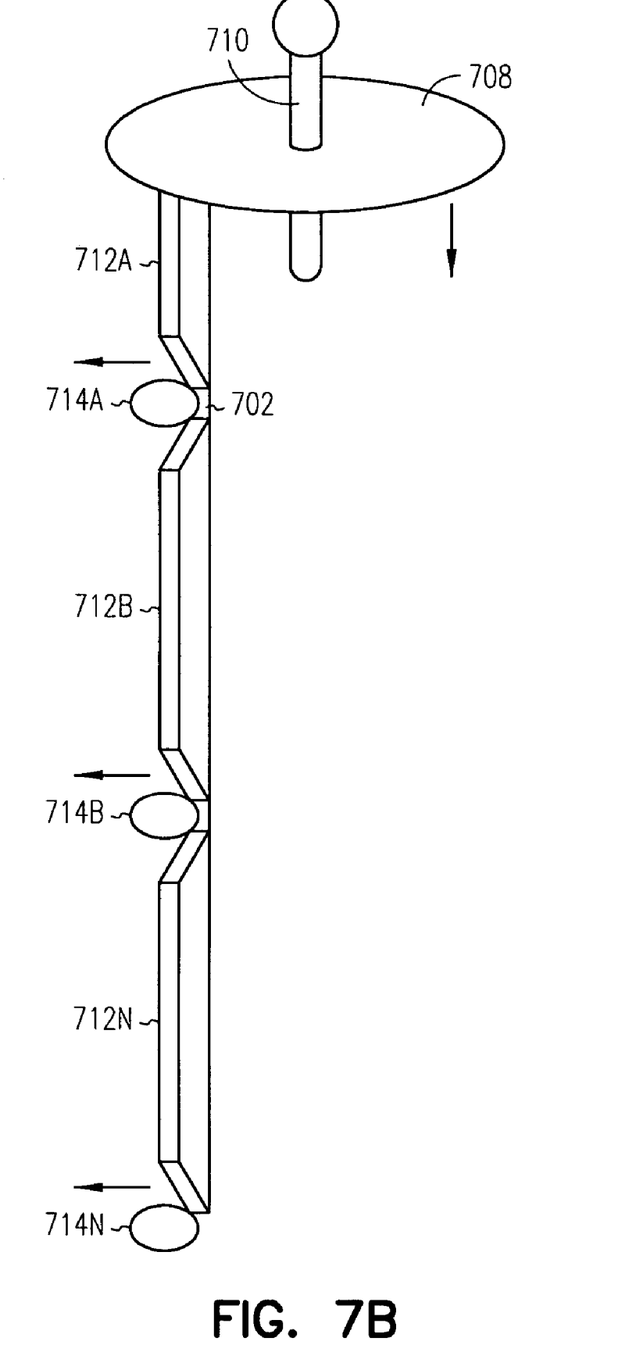

In some embodiments, the backing mass 208 may be inside the linear bearing 214. The linear bearing 214 may be within the housing 215. The linear bearing 214 may act as a guide for the backing mass 208. In particular, the linear bearing 214 may essentially preclude the backing mass 208 from displacing transversely relative to the mandrel 204, while allowing the backing mass 208 to displace axially relative to the mandrel 204. Accordingly, this prevention of lateral movement of the backing mass 208 precludes the additional load on one side of the piezoelectric transducer 210 and the stresses of pulling apart on the opposite side of the piezoelectric transducer 210. Embodiments of the invention are not limited to the use of a linear bearing for restriction/allowance of such movements of the backing mass 208. An alternative embodiment for restriction/allowance of such movements of the backing mass 208 is shown in FIGS. 7A–7B, which is described in more detail below.

The piezoelectric transducer 210 may be housed into sleeve 216. The sleeve 216 may then be threaded into the inner threads 220 of the tapered conical section 218. The backing mass 208 may then be threaded into the threads 213 of the sleeve 216 (as described above). The amount of torque applied because of the threading of the backing mass 208 into the sleeve 218 may be monitored by the strain gage 217. After the backing mass 208 is threaded into place, the screws are placed into the sleeve 216 to lock the backing mass 208 and the sleeve 216 into place. The housing 215 may be threaded into the first outer threads 225. In some embodiments, after the housing 215 is threaded into the first outer threads 225, the supporting components (described in FIGS. 7A–7B) for the backing mass 208 may be positioned in the housing 215. The top sub 203 may then be threaded into the top of the housing 215. This top sub 203 closes off the top of the housing 215 to preclude the fluid (e.g., drilling mud) from flowing inside the housing 215. In some embodiments, the pressure inside the housing 215 is approximately atmospheric. Furthermore, the tapered conical section 218 may be coupled to the mandrel 204. The centralizer assembly 201 may then be coupled to the top sub 203. More details of such operations is provided below.

Figure 3A:
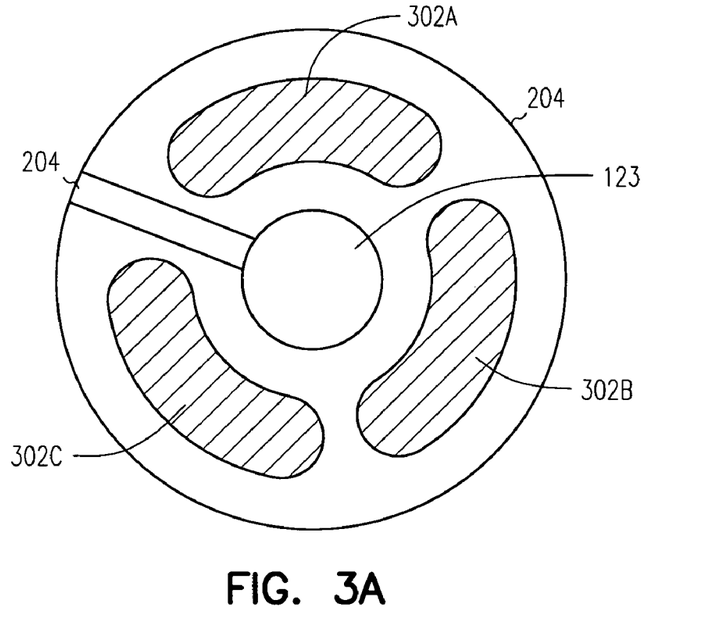
FIGS. 3A–3B illustrate top views of a mandrel that houses an acoustic telemetry transceiver, according to some embodiments of the invention.
Figure 3B:
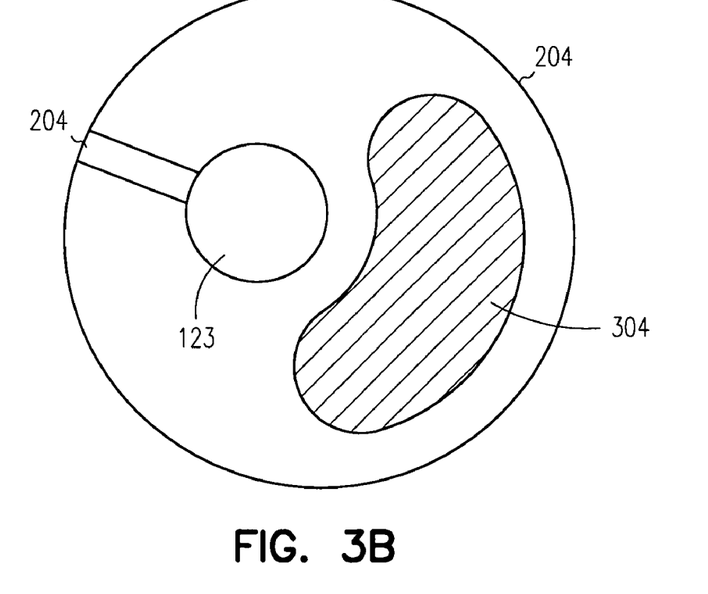

In some embodiments, the piezoelectric transducer 210 may be constantly under compression under a combination of drilling loads and actuation loads while the acoustic telemetry transceiver 123 is downhole. One embodiment of the piezoelectric transducer 210 that is partially assembled is shown in FIG. 3, which is described in more detail below.

As further described below, the acoustic actuator 206 may receive an electrical input from a driver and convert such input into an acoustical output. This acoustical output (from the acoustic actuator 206) may be modulated along the mandrel 204 (through the tapered conical section 218). Accordingly, in some embodiments, the acoustic actuator 206 transmits the acoustic output to the mandrel 204 through a single point of contact (the tapered conical section 218).

In particular, the tapered conical section 218 may couple the piezoelectric transducer 210 to the mandrel 204 to allow for the transmission of the acoustic signal (generated by the piezoelectric transducer 210) along the mandrel 204 to an acoustic receiver (part of a repeater along the drill string, receiver at the surface, etc.). The more contact between the acoustic actuator 206 and the mandrel 204 the better the transfer of the acoustic signal there between. In some embodiments, a tapered conical section 219 may be machined in the mandrel 204. Accordingly, the tapered conical section 218 and the tapered conical section 219 together may provide a rigid contact there between. In some embodiments, the tapered conical section 218 and the tapered conical section 219 may include corresponding tapers and threads to allow such sections to be coupled together. Accordingly, the acoustic telemetry transceiver 123 may be threaded and torqued into the mandrel 204 using the tapered conical section 218 and the tapered conical section 219. Additionally, the second outer threads 227 of the tapered conical section 218 may be threaded and torqued into a part of the mandrel 204 to allow for additional contact between the tapered conical section 218 and the mandrel 204.

Additionally, the tapered conical section 218 may include O-ring grooves 233 and 234. O-rings may be placed in the O-ring grooves 233 and 234. In some embodiments, the diameter of the O-ring placed in the O-ring groove 233 is larger than the diameter of the O-ring placed in the O-ring groove 234. In operation, pressure, which is created by the drilling mud as well as the pressure created by the pumping of the drilling mud downhole, is placed on these two different O-rings. The pressure between the two O-ring grooves 233 and 234 is atmospheric. Because the pressure placed on the two different O-rings is approximately the same, the larger diameter of the O-ring in the O-ring groove 233 (relative to the O-ring in the O-ring groove 234) may cause a resulting force to be directed down the taper of the tapered conical section 218. In other words, a pressure lock is created between the two different O-ring grooves 233 and 234. This pressure lock may allow for a more rigid contact between the tapered conical section 218 and the tapered conical section 219.

Accordingly, the tapered conical section 218 and the tapered conical section 219 in conjunction with the flow of drilling mud between the mandrel 204 and the acoustic telemetry transceiver 123 allows for more contact between the acoustic actuator 206 and the mandrel 204. In particular, the contact between the tapered conical section 218 and the tapered conical section 219 increases as the drilling mud flows. Moreover, during a disassembly operation, this drilling mud flow pressure is not present, thereby allowing for a potentially easier disassembly operation. Accordingly, some embodiments of the invention allow for more contact between the acoustic actuator 206 and the mandrel 204, while still allowing for a potentially easier disassembly operation.

The tapered conical section 218 may also include the bulkhead connector 229 in the tapered conical section 218. The bulkhead connector 229 may preclude a pressure leak in the section that includes the wiring 221 from entering the area that includes the piezoelectric transducer 210. In particular, the bulkhead connector 229 may include a section to couple the wiring 221 to wiring in the piezoelectric transducer 210 through springs within the tapered conical section 218 (which is described in more detail below in conjunction with FIGS. 5 and 6). In some embodiments, this coupling may be through a solder operation. The wiring 221 may electrically couple the piezoelectric transducer 210 to a signal source (not shown) for driving and controlling the piezoelectric transducer 210. Such a signal source may include an electrical driver, control circuits/electronics, etc.

The centralizer assembly 201 may provide support at the top end of the acoustic telemetry transceiver 123. In particular, the centralizer 202 may couple the top sub 203 to the mandrel 204. The centralizer 202 may be a ring of a number of fingers (e.g., four) that attach the acoustic telemetry transceiver 123 to the mandrel 204. The side of the ring adjacent to the top sub 203 may include a groove. As shown, a taper of the centralizer 202 may be approximately the same as the taper of the top sub 203. After the centralizer 202 is placed onto the top sub 203, the centralizer sub 205 may be threaded onto the top sub 203. This threading may cause the centralizer 202 to be pushed up the taper of the top sub 203. Additionally, this threading may cause the groove in the centralizer 202 to open, thereby causing the centralizer 202 to expand out toward the mandrel 204. Accordingly, the centralizer 202 is abutted against the mandrel 204 to provide support at the top end of the acoustic telemetry transceiver 123.

Additionally, O-rings are placed in the O-ring grooves 231, 232 and 233. In some embodiments, the diameter of the O-rings placed in the O-ring grooves 231 and 232 are larger than the diameter of the O-ring placed in the O-ring groove 233. In operation, pressure created by the drilling mud as well as the pumping of the drilling mud is placed on two of these different O-rings. In some embodiments, a pressure lock is created between the O-ring 231 and the O-ring 233. The O-ring 232 may provide redundancy for this pressure lock. If other words, if the pressure lock between the O-ring 231 and the O-ring 233 were to fail, a pressure lock is created between the O-ring 232 and the O-ring 233.

Further, the bolt 241 may be threaded into the top of the centralizer sub 205 until the bolt is abutted against the top sub 203. Accordingly, the centralizer 202 may remain in place against the mandrel 204 because of (1) the torque applied by the threading of the centralizer sub 205 onto the top sub 203; (2) the pressure lock generated by the O-rings; and (3) the bolt 241 being threaded into the top of the centralizer sub 205. Therefore, the centralizer assembly 201 may preclude lateral movement of the acoustic telemetry transceiver 123.

FIGS. 3A–3B illustrate top views of a mandrel that houses an acoustic telemetry transceiver, according to some embodiments of the invention. In particular, FIG. 3A illustrates a top view of a first configuration of the acoustic telemetry transceiver 123 within the mandrel 204. Within the mandrel 204, the acoustic telemetry transceiver 123 is surrounded by mud flow openings 302A–302C. FIG. 3B illustrates a top view of a second configuration of the acoustic telemetry transceiver 123 within the mandrel 204. In such a configuration, a mud flow opening 304 is adjacent to the acoustic telemetry transceiver 123. The mud flow openings 302A–302C and 304 allow for the drilling mud from the surface to flow down the borehole to the drill bit 126. The configurations of the acoustic telemetry transceiver 123 and the mud flow openings are by way of example and not by way of limitation. In particular, such configurations may include a lesser or greater number of the mud flow openings. Additionally, such mud flow openings may be alternative shapes and sizes.

FIG. 3A illustrates a configuration wherein a pressure from the mud flow through the surrounding mud flow openings 302A–302C may assist in the prevention of lateral movement by the components of the acoustic telemetry transceiver 123. FIG. 3B illustrates a configuration wherein the mud flow is more contiguous (through a single opening). Such a configuration may reduce the amount of wear and damage that the mud may cause to the acoustic telemetry transceiver 123. Additionally, this configuration may allow for easier passage of a wireline that may need to be passed through the mandrel 204 during operation.

Figure 4:
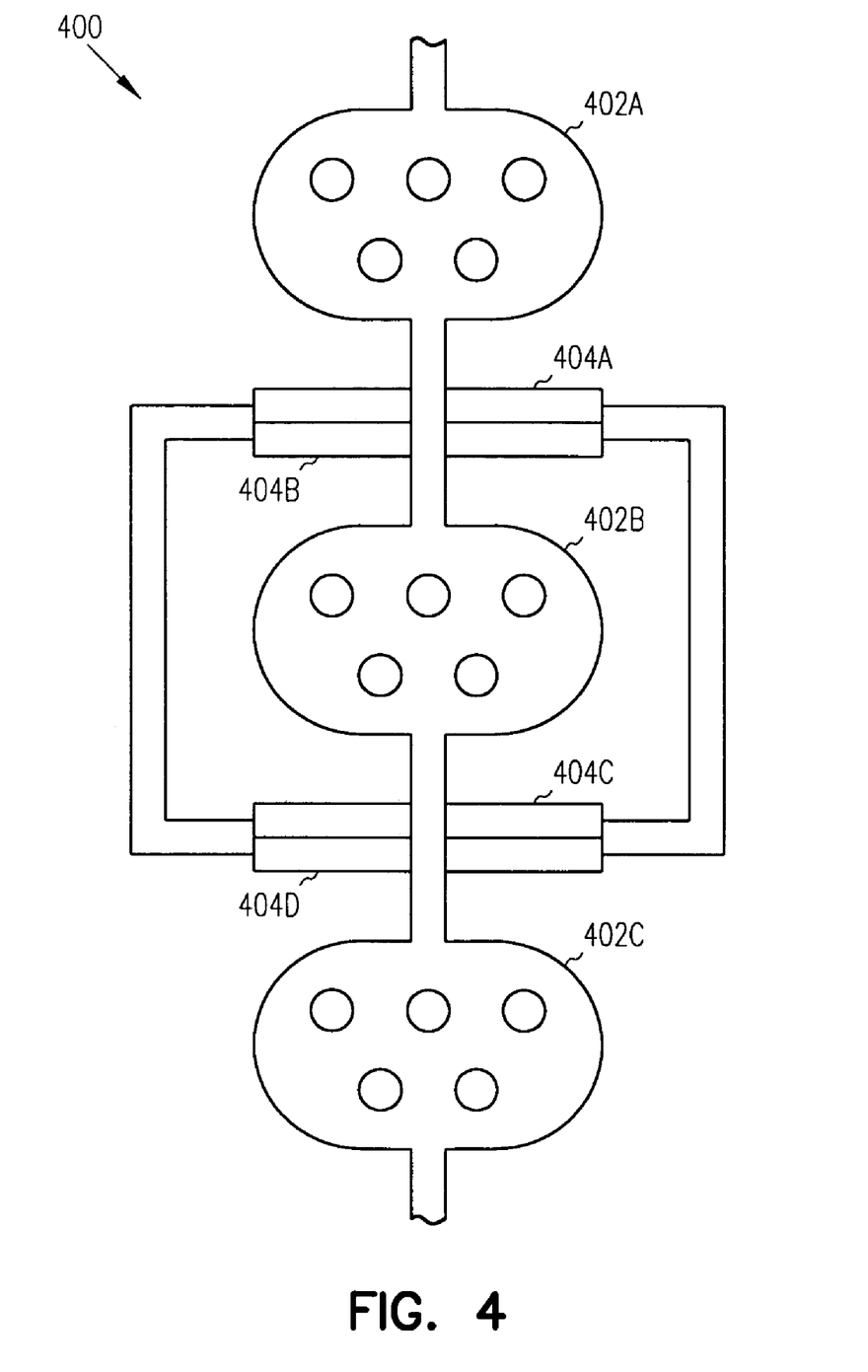
FIG. 4 illustrates a part of a piezoelectric transducer within an acoustic telemetry transceiver, according to some embodiments of the invention.

FIG. 4 illustrates a part of a piezoelectric transducer within an acoustic telemetry transceiver, according to some embodiments of the invention. In particular, FIG. 4 illustrates an embodiment of a part of the piezoelectric transducer 210 prior to it being completely assembled. The piezoelectric transducer 210 includes an electrode 402A, an electrode 402B and an electrode 402C. The piezoelectric transducer 210 also includes a piezoelectric element 404A, a piezoelectric element 404B, a piezoelectric element 404C and a piezoelectric element 404D. The piezoelectric transducer 210 may include a lesser or greater number of electrodes 402 and/or piezoelectric elements 404.

As shown, the electrodes 402A–402D may be a single sheet of material that is independent of non-permanent joints (such as solder joints, welding joints, etc.). Subsequently, the electrodes 402A–402D may be folded over the piezoelectric elements 404A–404D as part of the completion of the assembly of the piezoelectric transducer 210. In some embodiments, the electrode components 402A–402D may be composed of beryllium copper, copper, brass, silver, etc. The piezoelectric elements 404A–404D may be disks that are composed of ceramic material such as lead-zirconate-titanate (PZT), lead-titanate ($PbTiO_2$), lead-zirconate ($PbZrO_3$), barium-titanate ($BaTiO_3$), etc. In some embodiments, the piezoelectric transducer 210 may be replaced by suitable transducers constructed from magnetostrictive materials. In such an embodiment, connections between the electromagnets and the drive circuitry may be designed such as to eliminate non-permanent joints (such as solder).

In some embodiments, the electrodes 402A–402D may include one to a number of holes. An adhesive (such as an epoxy) may be inserted between the piezoelectric elements 404A–404D. Such an adhesive may flow in the holes of the electrodes 402A–402D, thereby forming a stronger bond between the piezoelectric elements 404A–404D. This adhesive may preclude the piezoelectric elements 404A–404D from moving relative to each other. Accordingly, such a configuration may allow the output form the piezoelectric transducer 210 to be more consistent.

Figure 5:
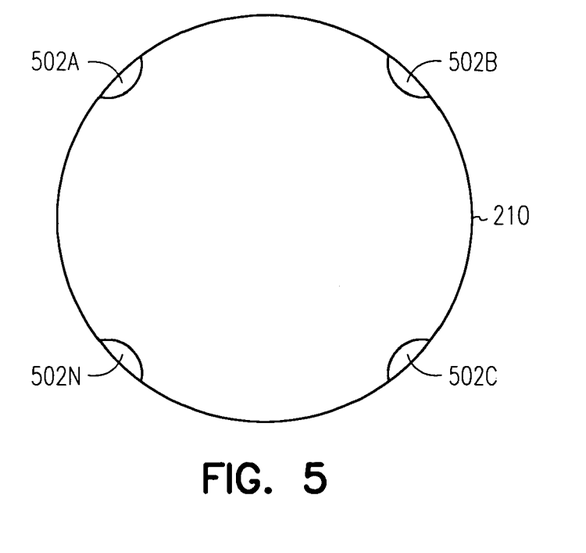
FIG. 5 illustrates a bottom view of a piezoelectric transducer in an acoustic telemetry transceiver, according to some embodiments of the invention.
Figure 6:
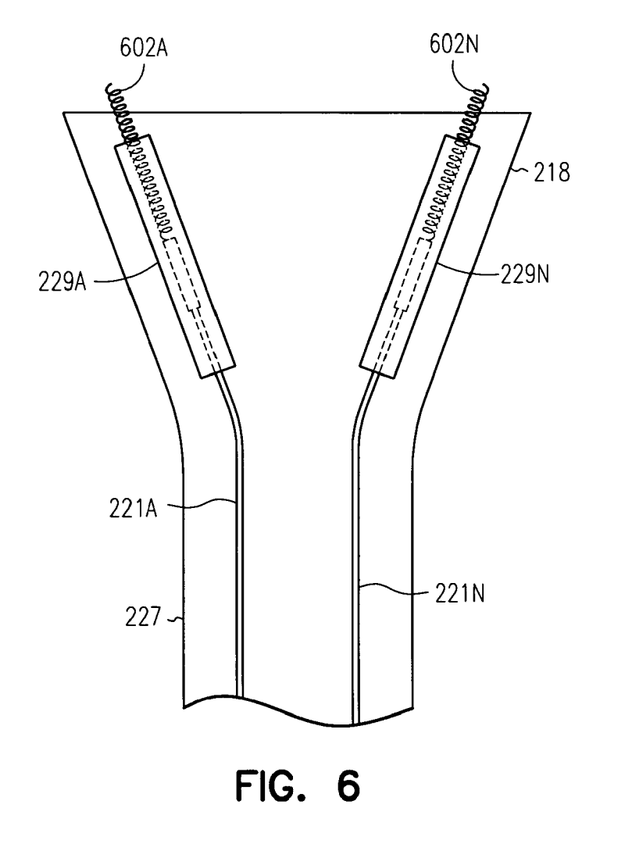
FIG. 6 illustrates a more detailed diagram of a tapered conical section in an acoustic telemetry transceiver, according to some embodiments of the invention.

FIGS. 5 and 6 together illustrate a configuration for coupling the piezoelectric transducer 210 to a signal source without using non-permanent joints. FIG. 5 illustrates a bottom view of a piezoelectric transducer in an acoustic telemetry transceiver, according to some embodiments of the invention. In particular, FIG. 5 illustrates an embodiment of a bottom view of the piezoelectric transducer 210. As shown, the bottom of the piezoelectric transducer 210 includes electrical contacts 502A–502N.

FIG. 6 illustrates a more detailed diagram of a tapered conical section in an acoustic telemetry transceiver, according to some embodiments of the invention. In particular, FIG. 6 illustrates an embodiment of the tapered conical section 218 that may be used in conjunction with the piezoelectric transducer 210 shown in FIG. 5. As shown in FIG. 2, the piezoelectric transducer 210 may be positioned (relative to the surface) on top of the tapered conical section 218. The tapered conical section 218 includes bulkhead connectors 229A–229N, springs 602A–602N and wiring 221A–221N. In particular, the tapered conical section 218 may include one to a number of bulkhead connectors 229, springs 602 and wiring 221. The tops of the springs 602A–602N may be aligned with the electrical contacts 502A–502N (shown in FIG. 5). In some embodiments, there is a one-to-one relationship between the electrical contacts 502A–502N and the springs 602A–602N. Accordingly, the spring 602A may be aligned with the electrical contact 502A. The spring 602B may be aligned with the electrical contact 502B. The spring 602C may be aligned with the electrical contact 502C. The spring 602N may be aligned with the electrical contact 502N. The tops of the springs 602A–602N may protrude out from the top of the tapered conical section 218. The bulkhead connectors 229 couple the springs 602 to the wiring 221, which may be coupled to a signal source (such as a driver, digital signal processor, etc.).

Accordingly, the coupling of the piezoelectric transducer 210 to the wiring 221 (through the tapered conical section 218) does not include non-permanent joints. Rather, the piezoelectric transducer 210 is positioned on top of the tapered conical section 218. The weight provided by backing mass 208, the piezoelectric transducer 210 and the compressive pre-stress load applied on the piezoelectric transducer 210 allows the electrical contacts 502 to stay in contact with the springs 602. Because this coupling does not include non-permanent joints, such coupling is not subject to be broken due to the stresses of actuator-induced vibrations as well as the ambient environment vibrations that are inherent during drilling operations.

FIGS. 7A–7B illustrate a configuration for a backing mass and its supporting components for an acoustic telemetry transceiver, according to some embodiments of the invention. In particular, FIG. 7A illustrates a backing mass 700, and FIG. 7B illustrates a number of supporting components of the backing mass 700. Referring to FIG. 2, the backing mass 700 and its supporting components may be substituted in place of the backing mass 208 and the linear bearing 214.

The top of the backing mass 700 includes a tapped hole 704. There are a number of slots 702A–702E along the sides of the backing mass 700. The bottom of the backing mass 700 includes a threaded connection 706. The threaded connection 706 may be used to couple the backing mass 700 to the piezoelectric transducer 210.

FIG. 7B includes a push down component 708 that includes a threaded connection 710. FIG. 7B also illustrates a set of components that are to be inserted into one of the slots 702. Accordingly, (while not shown) each of the slots 702A–702E may include such components. The components to be inserted into one of the slots 702 include a number of inserts 712A–712N and a number of support objects 714A–714N. FIGS. 7A–7B illustrate a set number of slots 702 as well as a set number of inserts 712 and support objects 714 to be inserted into a given slot 702. Embodiments of the invention may include a lesser or greater number of the slots 702, the inserts 712 and/or the support objects 714. In some embodiments, the composition of the supports objects 714 includes beryllium copper, steel, brass, stainless steel, etc. The support objects 714 may be of different shapes. For example, the support objects 714 may be approximately round. The support objects 714 may be approximately round on the side that is to face the housing, while being wedge-shaped, square, etc. on the opposing side. A given set of objects 714 for a given backing mass 700 and/or a given slot 702 may be of different shapes and sizes. An embodiment of an assembly operation of the backing mass 700 and its supporting components shown in FIGS. 7A–7B are now described.

Figure 8:
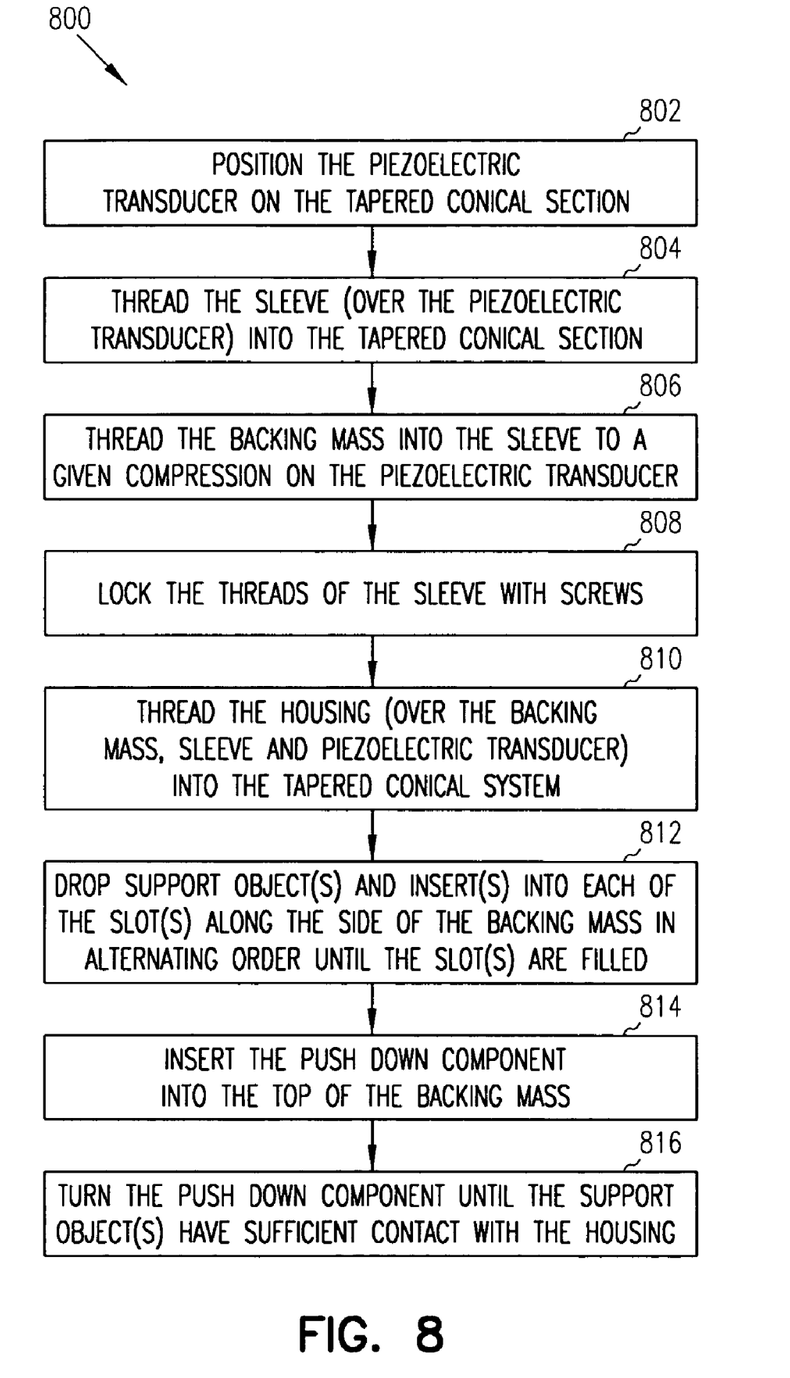
FIG. 8 illustrates a flow diagram for assembling an acoustic telemetry transceiver that includes supports objects (shown in FIGS. 7A–7B) for a backing mass, according to some embodiments of the invention.

In particular, FIG. 8 illustrates a flow diagram for assembling an acoustic telemetry transceiver that includes supports objects (shown in FIGS. 7A–7B) for a backing mass, according to some embodiments of the invention.

In block 802 of a flow diagram 800, the piezoelectric transducer is positioned on the tapered conical section. With reference to the embodiment of FIG. 2, the piezoelectric transducer 210 is positioned on the tapered conical section 218. Control continues at block 804.

In block 804, the sleeve is threaded (over the piezoelectric transducer) into the tapered conical section. With reference to the embodiment of FIG. 2, the sleeve 216 is threaded (over the piezoelectric transducer 210) into inner threads 220 of the tapered conical section 218. Control continues at block 806.

In block 806, the backing mass is threaded into the sleeve to a given compression for the piezoelectric transducer. With reference to the embodiment of FIG. 2, the backing mass 208 is threaded into the threads 213 of the sleeve 216. In some embodiments, this threaded is torqued such that a given compression is applied to the piezoelectric transducer 210. The strain gage 217 may measure this compression. Control continues at block 808.

In block 808, the threads of the sleeve (for coupling to the backing mass) are locked with screws. With reference to the embodiment of FIG. 2, the threads 213 are locked with screws (not shown) after the backing mass 208 is threaded therein. Control continues at block 810.

In block 810, the housing is threaded (over the backing mass, the sleeve and the piezoelectric transducer) into the tapered conical section. With reference to the embodiment of FIG. 2, the housing 215 is threaded (over the backing mass 208, the sleeve 216 and the piezoelectric transducer 210) into the threads 225 of the tapered conical section 218. In some embodiments, the size of the backing mass 208 is such that the backing mass 208 is not in contact with the housing 215. Control continues at block 812.

In block 812, support object(s) and insert(s) are dropped into each of the slot(s) along the side of the back mass in alternating order until the slot(s) are filled. With reference to the embodiments of FIG. 7A–7B, the support object(s) 714 and the insert(s) 712 are dropped into each of the slot(s) 702 in alternating order until the slot(s) are filled. In some embodiments, the sizes of the support object(s) 702 and the housing 215 are such that the support object(s) 714 are not in contact with the housing 215 when such objects are initially dropped into the slot(s) 702. Control continues at block 814.

In block 814, a push down component is inserted into the top of the backing mass. With reference to the embodiments of FIG. 7A–7B, the threaded connection 710 of the push down component 708 is inserted into the tapped hole 704. Control continues at block 816.

In block 816, the push down component is turned until the support object(s) have sufficient contact with the housing. With reference to the embodiments of FIGS. 2 and 7A–7B, the push down component 708 is turned, thereby causing the insert(s) 712 to be pushed toward each other. The pushing together of the insert(s) 712 causes the support object(s) 714 to push outwardedly. Accordingly, the push down component 708 may continue to be turned until the support object(s) 714 have sufficient contact with the housing 215. In some embodiments, if the support object(s) 714 are wheels, there is sufficient contact with the housing 215 if the support object(s) 714 essentially preclude lateral motion of the backing mass 700, while allowing for axial motion of the backing mass 700 relative to the axis of the mandrel 204. As described, the support object(s) 714 are in contact with the housing 215 in a limited number of places. Such contact is sufficient support to preclude lateral motion. Additionally, the limited contact still allows for axial motion (along the axis of the mandrel 204).

While the flow diagram 800 is described such that the backing mass 208 is supported by the support components shown in FIGS. 7A–7B, similar operations may be performed such that the backing mass 208 is supported by the linear bearing 214.

Figure 9:
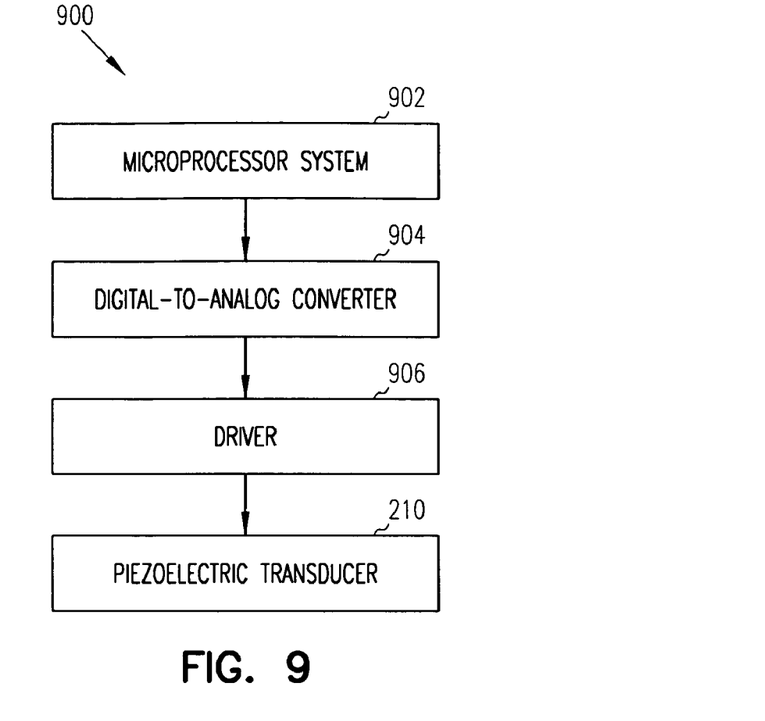
FIG. 9 illustrates a system for generating acoustic waveforms, according to some embodiments of the invention.

FIG. 9 illustrates a system for generating acoustic waveforms, according to some embodiments of the invention. In particular, FIG. 9 illustrates a system 900 that is part of a downhole tool in a drill string. Returning to FIG. 1 to help illustrate, the system 900 may be part of the downhole tool 124. The system 900 includes a microprocessor system 902, a Digital-to-Analog (D/A) converter 904, a driver 906 and the piezoelectric transducer 210. An output of the microprocessor system 902 is coupled to an input of the D/A converter 904. An output of the D/A converter 904 is coupled to an input of the driver 906. An output of the driver 906 is coupled to an input of the piezoelectric transducer 210. With reference to FIG. 2, the microprocessor system 902, the D/A converter 904 and the driver 904 may be coupled to the wiring 221.

The system 900 may generate any of a number of different acoustic waveforms, including Frequency Shift Key (FSK), Phase Shift Key (PSK), Discrete Multi-Tone (DMT), etc. Additionally, the system 900 may generate such acoustic waveforms in a number of different types of windows, including, Hamming, Hanning, etc.

The microprocessor system 902 may include different types of processors that generate different acoustic waveforms. For example, the microprocessor system 902 may include a general-purpose microprocessor, different types of Digital Signal Processors (DSPs) (such as floating point DSPs), etc. The microprocessor system 902 may also include different types of memory including different types of volatile and non-volatile memories. Foe example, the microprocessor system 902 may include flash memory, Random Access Memory (RAM) (e.g., Synchronous Dynamic RAM (SDRAM), DRAM, DDR-SDRAM, etc.), etc.

The microprocessor system 902 may also include different types of Input/Output (I/O) logic. Such I/O logic may comprise any suitable interface controllers to provide for any suitable communication link. The I/O logic for an embodiment provides suitable arbitration and buffering for one of a number of interfaces. For example, the microprocessor system 902 may have one or more suitable serial, parallel, Universal Serial Bus (USB) ports, etc. In some embodiments, the microprocessor system 902 may generate different waveforms (representative of data communications) that are to be transmitted to the surface. The microprocessor system 902 may generate digital representations of such waveforms, which are output to the D/A converter 904.

The D/A converter 904 may be part of a Coder/Decoder (CODEC) that encodes and decodes analog signals. The D/A converter 904 may receive the digital waveforms and covert such waveforms into an analog signal. The D/A converter 904 may output this analog signal to the driver 906.

This analog signal may be a low voltage signal (e.g., approximately one volt). Based on this analog signal, the driver 906 may generate a high voltage signal (e.g., approximately +300 volts to −300 volts, +150 volts to −150 volts, etc.). The driver 906 may be a bridge mode amplifier that may generate double the peak-to-peak voltage of the difference in the power supplies. This voltage generated by the driver 906 may be used to drive the piezoelectric transducer 210.

In some embodiments, the system 900 is modular. In particular, the system 900 is such that one of the different components therein may be interchanged without having to interchange other of the different components. For example, any or all of the microprocessor system 902, the D/A converter 904 and the driver 906 may be on a single printed circuit board. Accordingly, if a different driver 906 is needed, for example, to supply a different level of power, the printed circuit board for the driver 906 alone may be switched.

Figure 10:
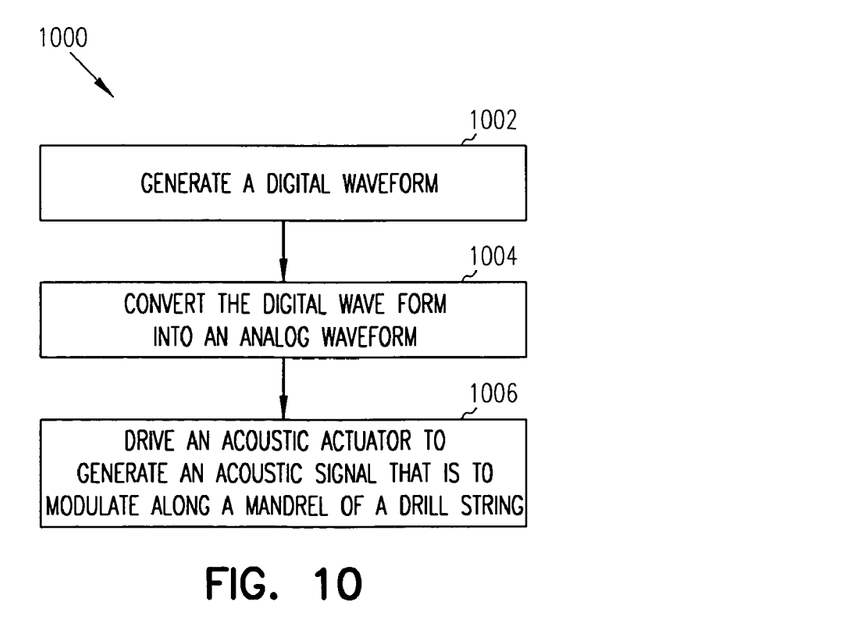
FIG. 10 illustrates a flow diagram for generating an acoustic signal, according to some embodiments of the invention.

FIG. 10 illustrates a flow diagram for generating an acoustic signal, according to some embodiments of the invention. In particular, a flow diagram 1000 illustrates an embodiment of an acoustic signaling operation by the acoustic telemetry transceiver 123 that is within the downhole tool 124.

In block 1002, a digital waveform is generated. With reference to the embodiment of FIG. 9, the microprocessor system 902 generates this digital waveform. Control continues at block 1004.

In block 1004, the digital waveform is converted into an analog waveform. With reference to the embodiment of FIG. 9, the D/A converter 904 performs this conversion. Control continues at block 1006.

In block 1006, an acoustic actuator is driven to generate an acoustic signal that is to modulate along a mandrel of a drill string. With reference to the embodiments of FIGS. 1, 2 and 9, the driver 906 drives the piezoelectric transducer 210 in the acoustic actuator 206 to generate the acoustic signal that is to modulate along the mandrel 204 of the drill string 108.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for an acoustic telemetry transceiver, in accordance with some embodiments of the invention. A number of figures show flow diagrams illustrating operations for an acoustic telemetry transceiver, in accordance with some embodiments of the invention. The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

In view of the wide variety of permutations to the embodiments described herein, this detailed description is intended to be illustrative only, and should not be taken as limiting the scope of the invention. For example, embodiments of the invention are described in reference the acoustic telemetry transceiver being internal to an inner mandrel where the drilling mud flows. However, embodiments of the invention are not so limited. In some embodiments, the acoustic telemetry transceiver may be positioned outside an inner mandrel but within an outer mandrel. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. An apparatus comprising:
a vibratory actuator to generate an acoustic signal that is to modulate along a mandrel of a drill string; and
a backing mass positioned adjacent to the vibratory transducer and restrained from lateral movement relative to an axis of the drill string.

2. The apparatus of claim 1, wherein the backing mass is on top of the vibratory actuator relative to a surface of a borehole during operation.

3. The apparatus of claim 1, wherein the vibratory actuator includes at least one electrode that is without a non-permanent joint.

4. The apparatus of claim 1, further comprising a centralizer assembly coupled to the mandrel.

5. The apparatus of claim 4, wherein the centralizer assembly is coupled to the mandrel at an end of the backing mass that is opposite an end that is adjacent to the vibratory actuator.

6. The apparatus of claim 1, further comprising a tapered conical section that is coupled to an end that is opposite an end that is adjacent to the backing mass.

7. The apparatus of claim 6, wherein the tapered conical section includes a first O-ring groove to house a first O-ring and a second O-ring groove to house a second O-ring.

8. The apparatus of claim 7, wherein the first O-ring groove is on top of the second O-ring groove relative to a surface of a borehole during operation, wherein a diameter of the first O-ring is greater than a diameter of the second O-ring.

9. The apparatus of claim 7, wherein a position of the tapered conical section relative to a position of the conical section of the mandrel is to increase contact between the tapered conical section and the conical section of the mandrel based on a pressure from a pump operation of a fluid between the vibratory actuator and the mandrel.

10. An apparatus comprising:
a signal source;
a piezoelectric transducer to generate an acoustic signal that is to modulate along a mandrel, wherein the piezoelectric transducer includes a bottom end having one or more electrical tabs; and
a section having one or more springs, the section to couple the signal source to the piezoelectric transducer with the one or more springs that are aligned with the one or more electrical tabs, wherein the section and the piezoelectric transducer are not physically attached together.

11. The apparatus of claim 10, wherein the piezoelectric transducer is without a non-permanent joint.

12. An apparatus comprising:
a mandrel having a first conical section;
an actuator that comprises a piezoelectric transducer to generate an acoustic signal that is to modulate along the mandrel; and
a second conical section to mate with the first conical section.

13. The apparatus of claim 12, wherein a position of the second conical section relative to a position of the first conical section is to increase contact between the second conical section and the first conical section based on a pressure of a flow of a fluid between the actuator and the mandrel.

14. The apparatus of claim 12, wherein the second conical section is on top of the first conical section relative to a surface of a borehole during operation.

15. The apparatus of claim 12, wherein the piezoelectric transducer includes at least one electrode that is without a non-permanent joint.

16. The apparatus of claim 12, wherein the actuator further comprises a backing mass positioned adjacent to the piezoelectric transducer and housed in a linear bearing.

17. A system comprising:
a drill string having a mandrel, wherein the drill string includes:
a sensor to monitor a downhole drilling parameter; and
a bottom hole assembly having a downhole tool that includes:
a piezoelectric transducer to generate an acoustic signal that is to modulate along the mandrel, the acoustic signal related to the downhole drilling parameter; and
a backing mass positioned adjacent to the piezoelectric transducer and housed in a linear bearing.

18. The system of claim 17, wherein the piezoelectric transducer includes at least one electrode that is without a non-permanent joint.

19. The system of claim 17, further comprising a centralizer assembly coupled to the mandrel at an end of the backing mass that is opposite an end that is adjacent to the piezoelectric transducer.

20. The system of claim 17, further comprising a tapered conical section that is coupled to an end that is opposite an end that is adjacent to the backing mass, wherein the mandrel has a conical section to mate with the tapered conical section.

21. A system comprising:
a drill string having a mandrel, wherein the drill string includes:
a sensor to monitor a downhole drilling parameter; and
a bottom hole assembly having a downhole tool that includes:
a piezoelectric transducer to generate an acoustic signal that is to modulate along the mandrel;
a backing mass positioned adjacent to the piezoelectric transducer and within a housing, wherein the backing mass includes one or more grooves along an external face of the backing mass;
at least one insert positioned in the one or more grooves; and
an object positioned adjacent to the at least one insert in the one or more grooves.

22. The system of claim 21, wherein a shape of the object is approximately round.

23. The system of claim 21, wherein a composition of the object is beryllium copper.

24. The system of claim 21, wherein the piezoelectric transducer includes at least one electrode that is without a non-permanent joint.

25. The system of claim 21, wherein the downhole tool further comprises a tapered conical section that is coupled to an end that is opposite an end that is adjacent to the backing mass.

26. The system of claim 25, wherein the mandrel has a conical section to mate with the tapered conical section.

27. The system of claim 26, wherein a position of the tapered conical section relative to a position of the conical section of the mandrel is to increase contact between the tapered conical section and the conical section of the mandrel based on a pressure of a flow of a fluid between the piezoelectric transducer and the mandrel.

* * * * *

UNITED STATES PATENT AND TRADEMARK OFFICE
CERTIFICATE OF CORRECTION

| | | |
|---|---|---|
| PATENT NO. | : 7,339,494 B2 | Page 1 of 1 |
| APPLICATION NO. | : 10/898884 | |
| DATED | : March 4, 2008 | |
| INVENTOR(S) | : Vimal V. Shah et al. | |

It is certified that error appears in the above-identified patent and that said Letters Patent is hereby corrected as shown below:

On the title page, item (75), in "Inventors", in column 1, line 3, delete "Plano," and insert -- The Colony, --, therefor.

Signed and Sealed this

Fourteenth Day of September, 2010

David J. Kappos
*Director of the United States Patent and Trademark Office*